United States Patent [19]

Okuno

[11] Patent Number: 4,692,672

[45] Date of Patent: Sep. 8, 1987

[54] VIBRATION WAVE MOTOR

[75] Inventor: Takuo Okuno, Yokohama, Japan

[73] Assignee: Canon Kabushiki Kaisha, Tokyo, Japan

[21] Appl. No.: 695,719

[22] Filed: Jan. 28, 1985

[30] Foreign Application Priority Data

Feb. 10, 1984 [JP] Japan ......................................... 24024

[51] Int. Cl.⁴ ............................................ H01L 41/08
[52] U.S. Cl. ..................................... 318/116; 310/317; 310/322; 310/323; 310/328
[58] Field of Search ........................ 318/114, 116, 118; 310/322, 323, 328, 317, 316

[56] References Cited

U.S. PATENT DOCUMENTS

| 3,371,233 | 2/1968 | Cook | 310/317 |
| 3,828,770 | 8/1974 | Kuris et al. | 318/116 X |
| 4,019,073 | 4/1977 | Vishnevsky et al. | 310/322 |
| 4,404,502 | 9/1983 | Magori et al. | 318/116 |
| 4,484,099 | 11/1984 | Kawai et al. | 310/323 X |
| 4,559,826 | 12/1985 | Nelson | 310/317 |

Primary Examiner—Donovan F. Duggan
Attorney, Agent, or Firm—Fitzpatrick, Cella, Harper & Scinto

[57] ABSTRACT

A vibration wave motor for driving a movable member by a travelling vibration wave generated in a vibration member having an electrostrictive element by applying a periodic voltage to the vibration member, intermittently applies the periodic voltage to the electrostrictive element to reduce a moving speed of the movable member without reducing an amplitude of the periodic voltage.

5 Claims, 12 Drawing Figures (a)

(b)

(c)

(d)

VIBRATION WAVE MOTOR

BACKGROUND OF THE INVENTION

1. Field of the Invention

The present invention relates to a vibration wave motor for frictionally driving a movable member by a travelling vibration wave, and more particularly, to a drive device for the vibration wave motor.

2. Description of the Prior Art

FIG. 1 shows an example of a vibration wave motor driven by a travelling vibration wave, which has recently been put into practice. Numeral 1 denotes an electrostrictive element such as PZT (titanium acid zirconium acid lead), and numeral 2 denotes a vibration member made of elastic material to which the electrostrictive elements 1 are bonded. The vibration member 2 together with the electrostrictive elements 1 are held on a stator (not shown). Numeral 3 denotes a movable member which is press-contacted to the vibration member 2 to form a rotor. A plurality of electrostrictive elements 1 are bonded, and one group of elements thereof are arranged at a pitch shifted by one quarter of wavelength λ of the vibration wave relative to the other group of elements. In each group, the electrostrictive elements are arranged at a pitch of one half of the wavelength with the polarities of adjacent elements being opposite to each other.

When a voltage Vo sin ωt is applied to one group of electrostrictive elements and a voltage of Vo cos ωt is applied to the other group, a bending vibration is generated in the vibration member 2, which vibration becomes a travelling wave and propagates in the vibration member 2 in a direction $X_1$ of FIGS. 2(a)-2(d). Since the movable member 3 is contacted to the vibration member 2, peaks of the travelling wave of the vibration member contact to the lower surface of the movable member 3 to move the movable member 3 in the direction $X_2$. Since the vibration wave motor of this principle generates a larger torque at a lower rotation speed than a conventional electromagnetic motor, reduction gears are not necessary. However, it has a drawback which is described below.

In this motor, an amplitude of the travelling vibration wave of the vibration member 2 is usually 2-3 μm. Accordingly, if the contact surface of the vibration member 2 or the movable member 3 includes roughness, the movable member 3 is not always urged to the peaks of the vibration wave but is also urged to valleys of the vibration wave. Since the mass point at the valley of the vibration wave has the opposite velocity component to the mass point at the peak (see FIG. 2), and if the movable member simultaneously contacts the peak and the valley of the vibration amplitude, the left and right frictional drive forces cancel each other and a drive efficiency is reduced. Even if the contact surfaces of the movable member 3 and the vibration member 2 are good, good drive is not attained if dust of comparable size to the vibration amplitude is introduced into the clearance between both surfaces. Since the amplitude is substantially proportional to an applied A.C. voltage, it appears that the vibration amplitude increases as the voltage is increased and the above problem is resolved. However, as the vibration amplitude increases, the motion of the mass point on the vibration member 2 becomes violent and the speed increases. As a result, the motor cannot be driven at a low speed. Further, it is not preferable from durability standpoint of the element to apply a high voltage a high voltage to the electrostrictive element for a long period of time. If a frequency of the A.C. voltage applied to the electrostrictive element is lowered, the above problem is resolved. However, the frequency of the A.C. voltage is usually 20K-30K Hz, and if it is lowered to an audio frequency band, the vibration of the vibration member is audible to human beings and causes a noise. Thus, the frequency of the A.C. voltage applied to the electrostrictive element cannot be lowered lower than 20 KHz and it is difficult to drive the vibration wave motor at a low speed.

The vibration wave motor usually requires the A.C. voltage sources. The present assignee proposed a technique to drive the vibration wave motor by a D.C. voltage instead of the A.C. voltage (as described in commonly assigned U.S. patent application Ser. No. 552,373, filed Nov. 16, 1983), but it merely applies a chopped D.C. voltage instead of the A.C. voltage and does not resolve the above problem.

SUMMARY OF THE INVENTION

It is an object of the present invention to drive the vibration wave motor at a high drive efficiency.

It is another object of the present invention to drive the vibration wave motor at a low speed with a high drive efficiency.

It is another object of the present invention to intermittently apply a periodic voltage to an electrostrictive element which drives a vibration wave motor.

DETAILED DESCRIPTION OF THE PREFERRED EMBODIMENTS

Figure 3:
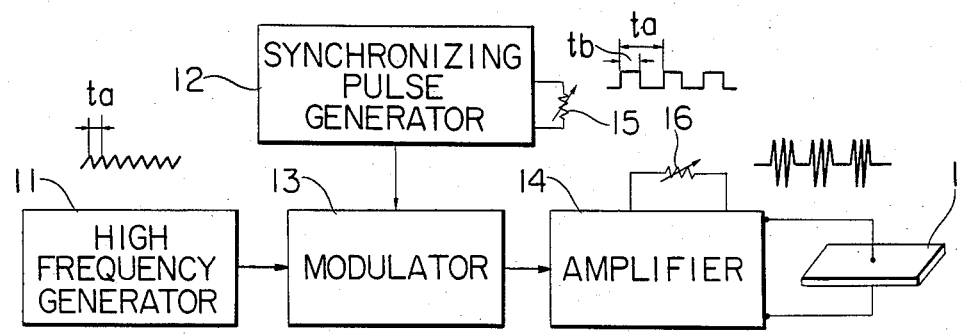
FIG. 3 is a circuit block diagram of one embodiment of the present invention.
Figure 5:
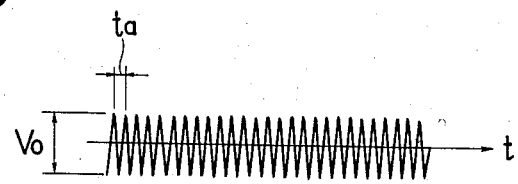
FIG. 5 shows a drive voltage waveform of a prior art vibration wave motor.

FIG. 3 is a block diagram of a circuit for generating an intermittent A.C. voltage having a duration tc, to be applied to an electrostrictive element 1. In FIG. 3, numeral 11 denotes an oscillator for generating a high frequency having a period ta, and numeral 12 denotes a synchronizing pulse generator which generates a rectangular pulse having a period tc. A duty of the rectangular pulse may be varied by varying a resistor 15. Numeral 13 denotes a modulator and numeral 14 denotes an amplifier. Those units modulate the high frequency with the rectangular pulse and amplify the modulated wave to produce the A.C. voltage having a waveform as shown in FIG. 5. An amplification factor of the amplifier 14 may be varied by a resistor 16. This A.C. voltage is applied to the electrostrictive element 1.

Figure 4:
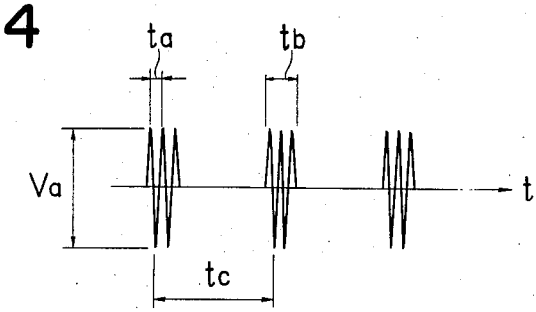
FIG. 4 shows an A.C. voltage generated by the circuit of FIG. 3.

An electric energy applied to the electrostrictive element is proportional to a square of the applied voltage. FIG. 5 shows conventional waveform of a drive voltage Vo (peak to peak) to be applied. In the embodiment shown in FIG. 3, when the same amount of energy as that applied to the electrostrictive element 1 is applied as the waveform as shown in FIG. 4, the amount of Va (peak to peak) of the drive voltage shown in FIG. 4 is given by Va=$\sqrt{A}$ Vo (A=tc/tb>1). Accordingly, by varying the amplification factor of the amplifier 14 to meet the above formula by varying the resistor 16, a voltage which is $\sqrt{a}$ times as large as that of the prior art system can be applied to the electrostrictive element 1 by the same energy so that the amplitude of the vibration generated in the vibration member increases and the reduction of the drive efficiency due to the dust introduced into the clearance between the movable member and the vibration member is prevented. Since the drive force is intermittently applied, the drive speed is not over increased and the speed control is facilitated. Further, a large amount of electric energy is not applied to the electrostrictive element on the average and the durability of the electrostrictive element is improved. Although the drive is intermittent, a sufficiently smooth drive is attained if the period tc is selected to be small (the frequency is higher than several tens Hz).

In the present embodiment, the duty of the rectangular pulse generated by the synchronizing pulse generator 12 is varied by the resistor 15. Thus, for a given amplification factor of the amplifier 14, the drive speed of the vibration wave motor can be changed by varying the ratio of tb to tc shown in FIG. 4.

A drive circuit for producing a voltage to be applied to the electrostrictive element from a D.C. power supply without amplifying an A.C. voltage is now explained.

Figure 1:
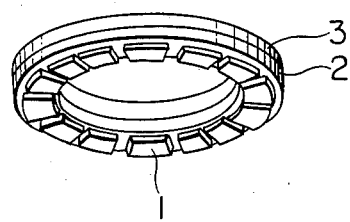
FIG. 1 shows major elements of a vibration wave motor.
Figure 2:
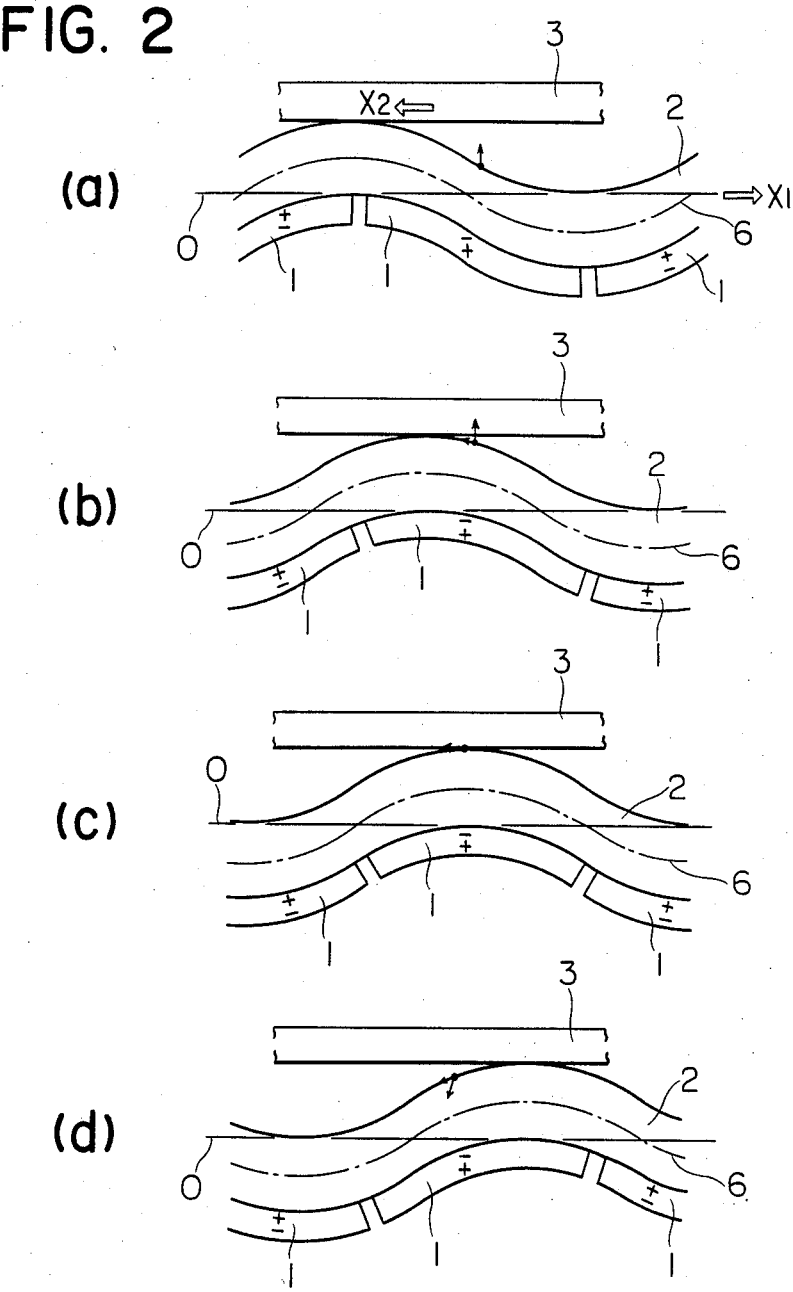
FIG. 2 illustrates a principle of drive of a vibration wave motor.
Figure 6:
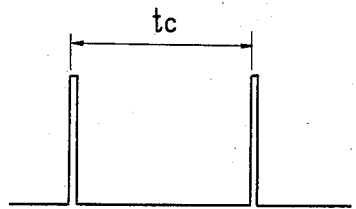
FIG. 6 shows a waveform in another embodiment of the present invention.
Figure 8:
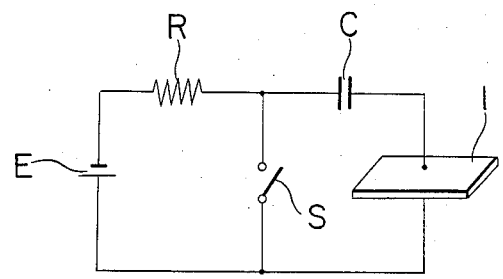
FIG. 8 shows a principle of a circuit for generating the waveform shown in FIG. 6.

When a rectangular pulse of a short duration (duty is not 50%) as shown in FIG. 6 is applied to the electrostrictive element 1 shown in FIG. 1, the vibration member 2 temporarily resonates at a specific resonance frequency f $$f = (2\pi/\lambda^2) \cdot \sqrt{h^2 E/12\rho}$$

where
h: thickness of the vibration member,
E: elastic modulus, and
$\rho$: density The waveform is shown in FIG. 8. This vibration is very close to the vibration waveform shown in FIG. 4 and the same effect as that in driving the electrostrictive element by the circuit of FIG. 3 is attained.

Accordingly, in the circuit of FIG. 8, during the turn-off of the switch S, the capacitor C is charged by the power supply voltage E, and during the turn-on of the switch S, voltage of the capacitor C is applied to the electrostrictive element to vibrate the vibration member 2.

Figure 7:
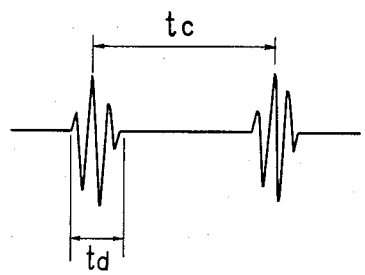
FIG. 7 shows a resonance waveform generated when the waveform shown in FIG. 6 is applied to an electrostrictive element.
Figure 9:
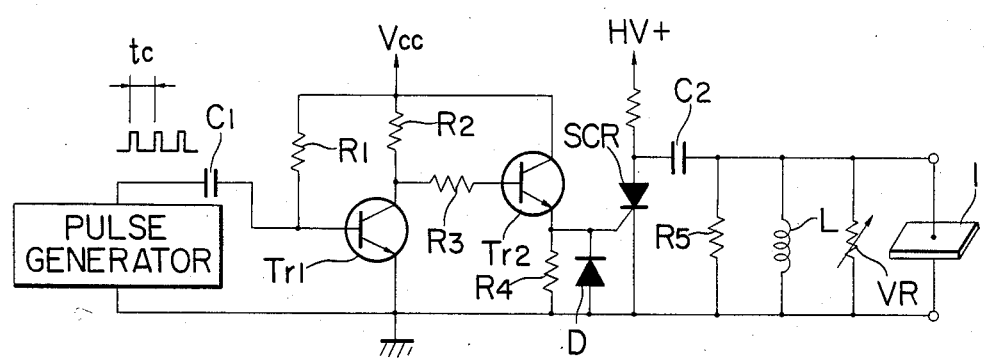
FIG. 9 shows a circuit for generating the waveform shown in FIG. 6.

Referring to FIG. 9, an embodiment in which the switch S of FIG. 8 is substituted by an electrical switch, is explained. In FIG. 9, SCR denotes a thyristor, D denotes a diode, Tr1 and Tr2 denote transistors, C1 and C2 denote capacitors, R1–R5 denote resistors, VR denotes a potentiometer and L denotes an inductor. The transistors Tr1 and Tr2 are turned on by the pulse generated by the pulse generator and applied to the capacitor Cl, to apply a pulse voltage to a gate of the thyristor SCR, which in turn is turned on so that the charge stored in the capacitor C2 is discharged. Then, the thyristor is reverse-biased and turned off. Since a resonance circuit constructed by R5, Vr, L and the capacitance of the electrostrictive element 1 oscillates, the oscillation continues for a time td. In the present embodiment, because of the resonance circuit, the oscillation time td is longer than that in the circuit of FIG. 8. The potentiometer VR is provided to adjust Q of the resonance circuit. The voltages repeatedly produced at the predetermined interval as shown in FIGS. 4 and 7 are included in the definition of the periodic voltage. The oscillation voltage includes the voltage oscillated as shown in FIG. 4. The present invention is applicable not only to the rotary vibration wave motor but also to a linear vibration wave motor.

In the present invention, the term electrostrictive element includes an element having a piezoelectric effect.

Although, in the foregoing explanation, the electrostrictive element is used for forming the vibration wave, it is apparent that the piezoelectric element having a piezoelectric effect, that is, second effect, may be used for forming the vibration wave.

What is claimed is:

1. A vibration wave motor comprising:
   (a) a vibration member including first and second electrostrictive means;
   (b) a control circuit for intermittently applying frequency signals of different phases, respectively, to said first and second electrostrictive means, thereby producing a travelling wave in said vibration member according to the application of the frequency signals to said first and second electrostrictive means;
   (d) a movable member in operational relationship with said vibration member is driven by the travelling wave; and
   (d) an adjusting means for adjusting a ratio of a first interval during which the frequency signal is applied to said electrostrictive means to a second interval during which the frequency signal is not applied to said electrostrictive means, thereby controlling motor drive speed.

2. A vibration wave motor according to claim 1, wherein said electrostrictive elements are piezoelectric means.

3. A vibration wave motor comprising:
   (a) a vibration member including first and second electrostrictive means adapted to be driven by a travelling wave;
   (b) a movable member in operational relationship with said vibration motor driven by the travelling wave;
   (c) a frequency signal generating circuit for generating a continuous frequency signal of a predetermined frequency;
   (d) a pulse generating means for generating a pulse of a predetermined duty ratio;
   (e) a conversion circuit for converting said continuous frequency signal into an intermittent frequency signal on the basis of the duty ratio of the pulse from said pulse generating means;
   (f) an applying means for intermittently applying said intermittent frequency signal converted by said conversion circuit to said first and second electrostrictive means, respectively, as a phase shifted signal, whereby a travelling wave is generated in said vibration member in response to the application of said frequency signal; and (g) an adjusting means for adjusting the duty of repeating the intermittent frequency signal on the basis of the duty ratio of the pulse, thereby controlling motor driving speed.

4. A vibration wave motor according to claim 3, wherein said electrostrictive elements are piezoelectric means.

5. A vibration wave motor according to claim 3 wherein said adjusting means adjusts a duty ratio of the pulse generated by said pulse generating means.

* * * * *

UNITED STATES PATENT AND TRADEMARK OFFICE
CERTIFICATE OF CORRECTION

PATENT NO. : 4,692,672
DATED : September 8, 1987
INVENTOR(S) : TAKUO OKUNO

It is certified that error appears in the above-identified patent and that said Letters Patent is hereby corrected as shown below:

ON THE TITLE PAGE, ITEM [30],

Line 2, "24024" should read --59-24024--.

COLUMN 1:

Line 49, "to valleys" should read --to the valleys--.

COLUMN 2:

Line 1, delete "a high voltage" (second occurrence);
    Line 13, "sources." should read --source.--.

COLUMN 3:

Line 59, "S, voltage" should read --S, the voltage--.

UNITED STATES PATENT AND TRADEMARK OFFICE
CERTIFICATE OF CORRECTION

PATENT NO. : 4,692,672
DATED : September 8, 1987
INVENTOR(S) : TAKUO OKUNO

It is certified that error appears in the above-identified patent and that said Letters Patent is hereby corrected as shown below:

COLUMN 4:

Line 6, "Vr," should read --VR,--;
    Line 38, "(d)" should read --(c)--;
    Line 48, "elements" should read --means--;
    Line 49, "means." should read --elements.--;
    Line 55, "motor" should read --member--.

COLUMN 6:

Line 4, "elements" should read --means--;
    Line 5, "means." should read --elements.--;
    Line 6, "claim 3" should read --claim 3,--.

Signed and Sealed this

Fifth Day of January, 1988

Attest:

DONALD J. QUIGG

Attesting Officer      Commissioner of Patents and Trademarks